Patented Nov. 21, 1922.

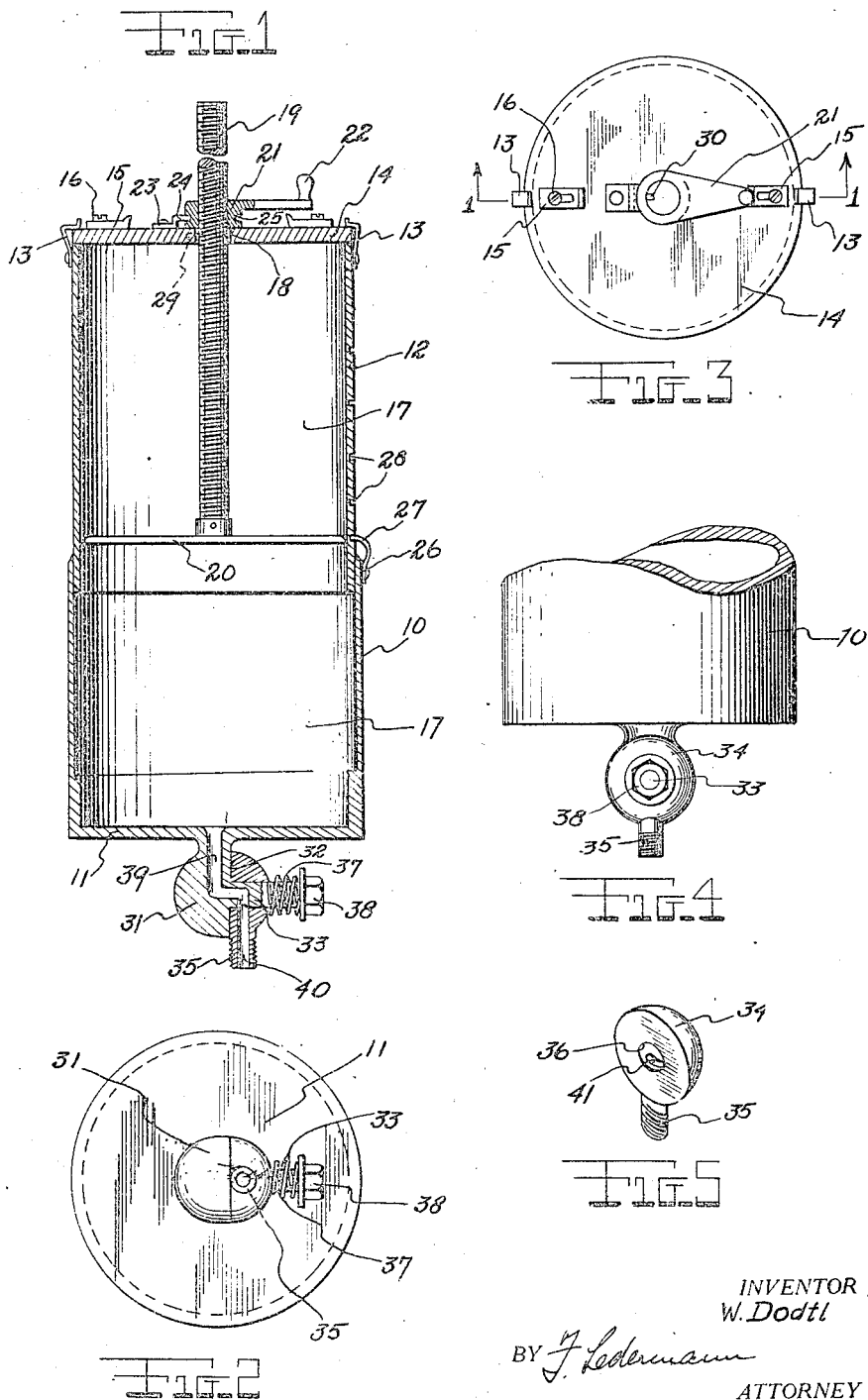

1,435,916

UNITED STATES PATENT OFFICE.

WILLIAM DODTL, OF NEW YORK, N. Y.

GREASE CUP.

Application filed April 26, 1922. Serial No. 556,709.

*To all whom it may concern:*

Be it known that I, WILLIAM DODTL, a citizen of Germany, residing at New York, in the county of New York and State of New York, have invented certain new and useful Improvements in Grease Cups, of which the following is a specification.

This invention relates to grease cups and the main object is to provide a device as described having a telescopic lubricant chamber by which the volume thereof can be varied to suit the conditions under which it is operating.

Another object is to provide a means, within the said lubricant chamber for urging grease to the point of lubrication and preventing it from adhering to the walls within the chamber.

Still another object is to provide a universal joint near the attaching end of the grease cup so that the main body may be placed at an angular position with respect to the machine part, to which it is secured, and still function properly.

These and other objects will become apparent in the description below in which characters of reference refer to like-named parts in the drawing.

Fig. 1 is a vertical sectional view of the complete device.

Figure 2 is a bottom plan view of the same.

Figure 3 is a top plan view of the same.

Figure 4 is a fragmentary side elevational view of the lower portion of the device.

Figure 5 is a perspective view of the universal joint element, by which the device is secured to the machine part.

Describing the drawing in detail, numeral 10 indicates an annular outer shell body which has a bottom 11 formed therewith.

An open ended tubular member 12 slidable within shell 10 has a plurality of bent spring clips 13 secured near the upper end which retain a cover plate 14 seated upon the upper open end of said member 12. A pair of diametrically opposed release bolts 15 are slidably secured to the upper surface of said cover plate 14 by screws 16. Said bolts 15 engage the ends of the clips 13, which lap over the cover plate, and spread the latter outwardly so as to permit removal of the said cover when desiring to clean the lubricant chamber 17.

Said cover plate 14 has a centrally located hole 18 which has a relatively long threaded feeder stem 19 passing therethru. An annular pressure plate 20 is secured to the lower end of said stem 19 and contacts loosely with the internal surface of the tubular member 12.

A rotatable crank 21 having a knob handle 22 engages the threaded stem 19 and is retained upon cover plate 14 by a bent finger plate 23 which has its free end 24 engaged in the crank recess 25.

A pin 29 secured in the cover plate 14 projects radially into the hole 18 and engages the slot 30 preventing the rotation of the stem 19 and permitting a lateral raising and lowering movement only.

A resilient grip member 26 attached to the upper end of shell 10 has a projecting lip 27 the latter engageable with a series of slits 28 which are formed longitudinally on the external surface of the tubular member 12.

The bottom 11 has a substantially semi-spherical extension 31 formed integral therewith and is provided with a flat surface 32 and a horizontally extending threaded nipple 33. A similar semi-spherical member 34 has a threaded stud 35 and a horizontal hole 36 is slipped over nipple 33. The flat surfaces of both members 31 and 34 are kept in frictional contact by an expansion spring 37, the latter being retained between member 34 and nipple nut 38. Said extension 31 has an intercommunicating port 39 following a downward course and jibes with port 40 of member 34. The inner end of said port 40 is provided with a distended mouth 41, running parallel to the plane of rotation.

When installing the grease cup, the threaded stud 35 is threaded into a hole in a machine part. In some cases, due to obstruction a rigid grease cup could not be applied. Rotating the lower shell 10 about the nipple 33 will avoid an obstruction or projection and still permit the free circulation of the lubricant from the chamber 17 thru the communicating ports 39 and 40 thence passing into the machine part.

In order to fill the chamber 17 with a grease which generally is of a slow flowing variety of relatively high viscosity, said chamber 17 is removed in its entirety by disengaging the lip 27 from its slit 28. The crank 21 is then rotated so as to draw the plate 20 up against the cover 14, and the grease is then packed into said chamber against the plate, filling the chamber thru the mouth of the same. When full, the chamber is then replaced and secured by the lip 26. As the grease is absorbed at the bearing additional feed pressure is obtained by rotating crank handle 22. Said rotation will feed stem 19 downwardly urging the grease in the grease flow to greater speed.

The volume of chamber 17 can be varied in volume by telescoping the upper tube 12 into shell 10 and is retained in any of the extended positions by flexible member 26 engaging one of a series of slots 28.

Thus it is apparent that I have provided a grease cup which may be refilled in a very short time, and which may be easily and quickly replaced with no danger of the grease escaping or being forced out during the replacing operation, which is common on the ordinary grease cup and which make the refilling operation very disagreeable and therefore often neglected.

I claim—

A device of the class described comprising a lower shell member, a similar member slidable therein, a semi-spherical extension formed on the bottom of the body of said lower member having a connecting port therein, and a flat surface thereon, a threaded nipple projecting from said surface, a corresponding member rotatable on said nipple, the latter having a port with a distended mouth, a spring urging the last named members into frictional contact with each other, a pressure plate slidable within the shell members, means for lowering the pressure plate and means for lifting the same.

In witness whereof I affix my signature.

WILLIAM DODTL.